United States Patent
Finger et al.

(10) Patent No.: US 8,884,983 B2
(45) Date of Patent: Nov. 11, 2014

(54) TIME-SYNCHRONIZED GRAPHICS COMPOSITION IN A 2.5-DIMENSIONAL USER INTERFACE ENVIRONMENT

(75) Inventors: James C. Finger, Kirkland, WA (US); Richard W. Russell, Kirkland, WA (US); Martin Regen, Munich (DE); Joel B. Deaquero, Redmond, WA (US); Andrew Douglas Reddish, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1135 days.

(21) Appl. No.: 12/165,270

(22) Filed: Jun. 30, 2008

(65) Prior Publication Data

US 2009/0322786 A1    Dec. 31, 2009

(51) Int. Cl.
| | |
|---|---|
| *G06T 11/60* | (2006.01) |
| *G09G 5/397* | (2006.01) |
| *H04N 21/431* | (2011.01) |
| *H04N 21/443* | (2011.01) |
| *H04N 21/472* | (2011.01) |
| *H04N 21/43* | (2011.01) |

(52) U.S. Cl.
CPC ......... *H04N 21/443* (2013.01); *H04N 21/4312* (2013.01); *H04N 21/47205* (2013.01); *H04N 21/4314* (2013.01); *H04N 21/4307* (2013.01); *H04N 21/4316* (2013.01)
USPC .......................................... 345/629; 345/634

(58) Field of Classification Search
CPC .................... G09G 2340/12; G09G 2340/125; G09G 5/399; G09G 5/377; G09G 5/397; G06T 11/60

USPC .................. 345/629, 634, 636, 637, 638, 539
See application file for complete search history.

(56) References Cited

U.S. PATENT DOCUMENTS

| | | | |
|---|---|---|---|
| 6,144,797 A | 11/2000 | MacCormack et al. | |
| 6,154,210 A * | 11/2000 | Anderson | 715/840 |
| 6,578,070 B1 | 6/2003 | Weaver et al. | |
| 6,678,006 B1 | 1/2004 | Velez et al. | |

(Continued)

FOREIGN PATENT DOCUMENTS

WO    01/35639    5/2001

OTHER PUBLICATIONS

Jurgen Geerlings, Eric Desmicht, and Hugues de Perthuis, A Single-Chip MPEG2 CODEC for DVD+ RW, Feb. 2003, IEEE Solid-State Circuits Conference, Digest of Technical Papers, ISSCC, 2003 IEEE International, pp. 40-41, total of 8 pages in download from http://ieeexplore.ieee.org/stamp/stamp.jsp?arnumber=01234198.*

(Continued)

*Primary Examiner* — Jeffery A Brier
(74) *Attorney, Agent, or Firm* — Micah Goldsmith; Judy Yee; Micky Minhas

(57) ABSTRACT

Software interfaces are configured to enable functionality that is commonly implemented in special-purpose hardware for mixing AV content into a set of 2.5-D graphics planes to be exposed to high level processes executing in a computing environment in a fully portable manner. Illustratively, the interfaces include a planar mixer (named "IPlanarMixer") that abstracts the mixing hardware, and a graphics plane interface (named "IPlane") that abstracts individual instances of planes that are retrieved from, and handed off to the planar mixer as the 2.5-D graphics planes are built up and rendered in a computing environment to support interactive graphic experiences for a user.

19 Claims, 4 Drawing Sheets

(56) References Cited

U.S. PATENT DOCUMENTS

| | | |
|---|---|---|
| 6,804,449 B1 | 10/2004 | Desai |
| 7,099,569 B2 | 8/2006 | Gadre et al. |
| 7,180,549 B2 | 2/2007 | Lin |
| 2003/0123857 A1 | 7/2003 | Egawa et al. |
| 2004/0046781 A1 | 3/2004 | Nittoor |
| 2006/0227248 A1 | 10/2006 | Merritt |
| 2007/0002045 A1* | 1/2007 | Finger et al. ............... 345/422 |
| 2007/0147781 A1* | 6/2007 | Shibata ....................... 386/95 |
| 2007/0285439 A1* | 12/2007 | King et al. .................. 345/638 |
| 2008/0298219 A1* | 12/2008 | Yamagata et al. ......... 369/275.1 |

OTHER PUBLICATIONS

Gallery, Richard, et al., "Hardware/Software Partitioning and Simulation of Video/Graphics Subsystem Using Systemc", Institute of Technology, Blanchardstown, Ireland, http://www.edacafe.com/technical/papers_pdf/dvcon2004/20_Gallery.pdf, 2004, 8 pages.

* cited by examiner

TIME-SYNCHRONIZED GRAPHICS COMPOSITION IN A 2.5-DIMENSIONAL USER INTERFACE ENVIRONMENT

BACKGROUND

In typical interactive media environments supported by media rendering devices such as personal computers ("PCs") and portable electronic devices including navigation systems, mobile phones, and set top boxes, visual content such as video, graphics, and menus are given a "Z order" that provides a visual order for the content on a display screen. The Z order controls how visual elements appear to stack on top of one another along an imaginary z-axis which extends outwardly from the display screen. Visual content with a lower Z order appears to be at the bottom of the display while visual content with a higher Z order appears to be on top of the lower Z ordered content.

In some media environments, 2.5-dimensional ("2.5-D") graphics are utilized in which pieces of audio and visual ("AV") content are separately organized and processed into multiple 2-D planes that are overlaid, or stacked, into a single composited image that is rendered on the display. This stacking arrangement is considered the additional 0.5-D. The 2.5-D planes can be generated using separate processes and may be characterized, for example, by different frame rates, resolutions, color spaces, image size, and image position. Some of these characteristics including size and position, and the Z order of various elements in the 2-D planes, can typically change over time as a particular piece of content like a movie or game is rendered by the player. Such elements may be used, for example, to implement a user interface ("UI") by which a user may interactively experience the AV content in the 2.5-D media environment through constructs such as menu systems, interactive graphics, and the like.

Both hardware and software, alone or in combination, can implement 2.5-D interactive media environments. For example, system on chip ("SoC") and other similar arrangements often implement 2.5-D functionality substantially in hardware. Such arrangements are generally popular because they can typically provide low cost 2.5-D solutions. However, because such hardware solutions are specialized, they tend not to support portability across a variety of applications or environments.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Software interfaces are configured to enable functionality that is commonly implemented in special-purpose hardware for mixing AV content into a set of 2.5-D graphics planes to be exposed to high level processes executing in a computing environment in a fully portable manner. Illustratively, the interfaces include a planar mixer (named "IPlanarMixer") that abstracts the mixing hardware, and a graphics plane interface (named "IPlane") that abstracts individual instances of planes that are retrieved from, and handed off to the planar mixer as the 2.5-D graphics planes are built up and rendered in a computing environment to support interactive graphic experiences for a user.

In a various illustrative examples, the present interfaces may support interactive experiences and UIs in a diverse set of computing environments. Support is provided for thin-clients that typically have constrained resources (such as processing power and memory) using "embedded" operating systems that are optimized for such conditions (such as Microsoft Windows® CE), as well as thick clients that run more feature-rich operating systems where resources are more plentiful, as in desktop PC environments.

The IPlanarMixer interface supports composition of the graphics planes used for 2.5-D interactive experiences by allocating memory for the planes in which the graphics render, and applying business rules to compose finished planes into a 2.5-D stack. The IPlane interface hands off finished graphic planes to IPlanarMixer through an abstraction of a single graphics plane within a set of 2.5-D planes by holding a rectangular array of pixels (picture elements) that may be programmatically manipulated, as well as "clearrect" data that is used to implement holes or windows that can be punched through multiple planes to produce a given graphical effect or interactive experience. The graphic planes include a main video plane, secondary video plane (e.g., for "picture-in-picture" features), subpicture plane (e.g., for elements such as subtitles), an interactive graphics plane (e.g., for supporting advanced viewing, menu, content navigation and selection, and other interactive features), a cursor plane, and an on-screen display ("OSD") plane.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings. Elements are not drawn to scale unless otherwise indicated.

DETAILED DESCRIPTION

Figure 1:
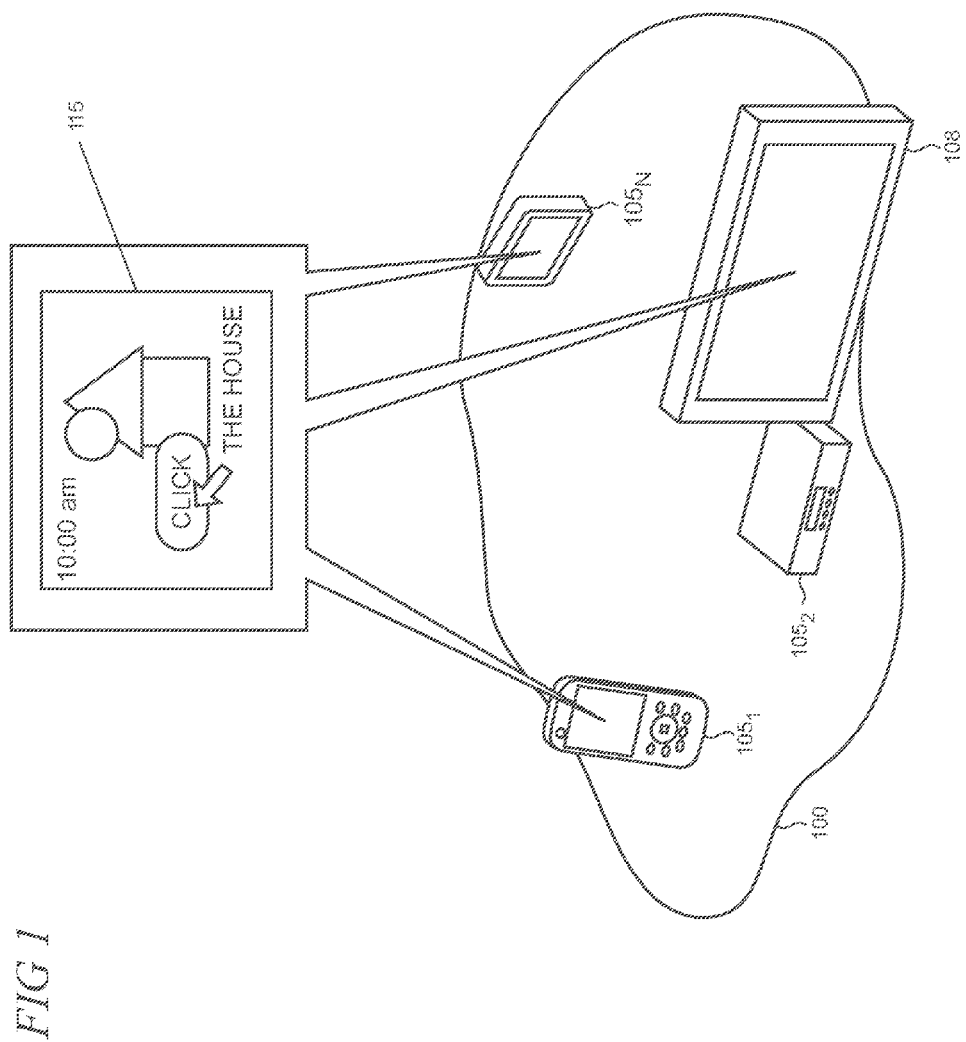
FIG. 1 shows an illustrative 2.5-D media rendering environment in which several illustrative devices each render AV content that is composited from multiple graphics planes.

FIG. 1 shows an illustrative interactive 2.5-D graphics environment 100 in which several illustrative AV content rendering devices $105_{1, 2 \ldots N}$ each render AV content that is composited from multiple graphics planes. Devices 105 are representative of the various devices that are currently available that may be used to display 2.5-D AV content. Devices 105 include, for example, personal electronic devices such as phones, pocket PCs, handheld PCs, smart phones, PDAs (personal digital assistants), handheld game devices, personal media players such as MP3 players, ultra-mobile PCs, and the like, as represented by device $105_1$ in FIG. 1. Also shown in the 2.5-D graphics environment 100 are a set top box ("STB") $105_2$ that is coupled to a conventional monitor or television 108, and a portable navigation system $105_N$ that uses GPS (Global Positioning System) technology. It is emphasized that these particular devices are illustrative, and other devices may be utilized as required to meet the needs of a given implementation.

The devices shown in FIG. 1 are typically designed to operate with fewer resources, such as memory and processing power, as compared with a PC, for example. Accordingly, in this illustrative example, devices 105 run the Microsoft Windows® CE operating system (which is also called Windows Embedded CE). Embedded operating systems are typically designed to be very compact and efficient, and intentionally omit functions that the feature-rich, non-embedded computer operating systems provide, and which may not be used by the specialized applications running on a device. Embedded operating systems are also known as "real-time operating systems." However, in alternative arrangements, other operating systems including, for example Microsoft Windows® and other types of devices such as desktop and laptop personal computers may be utilized.

Figure 2:
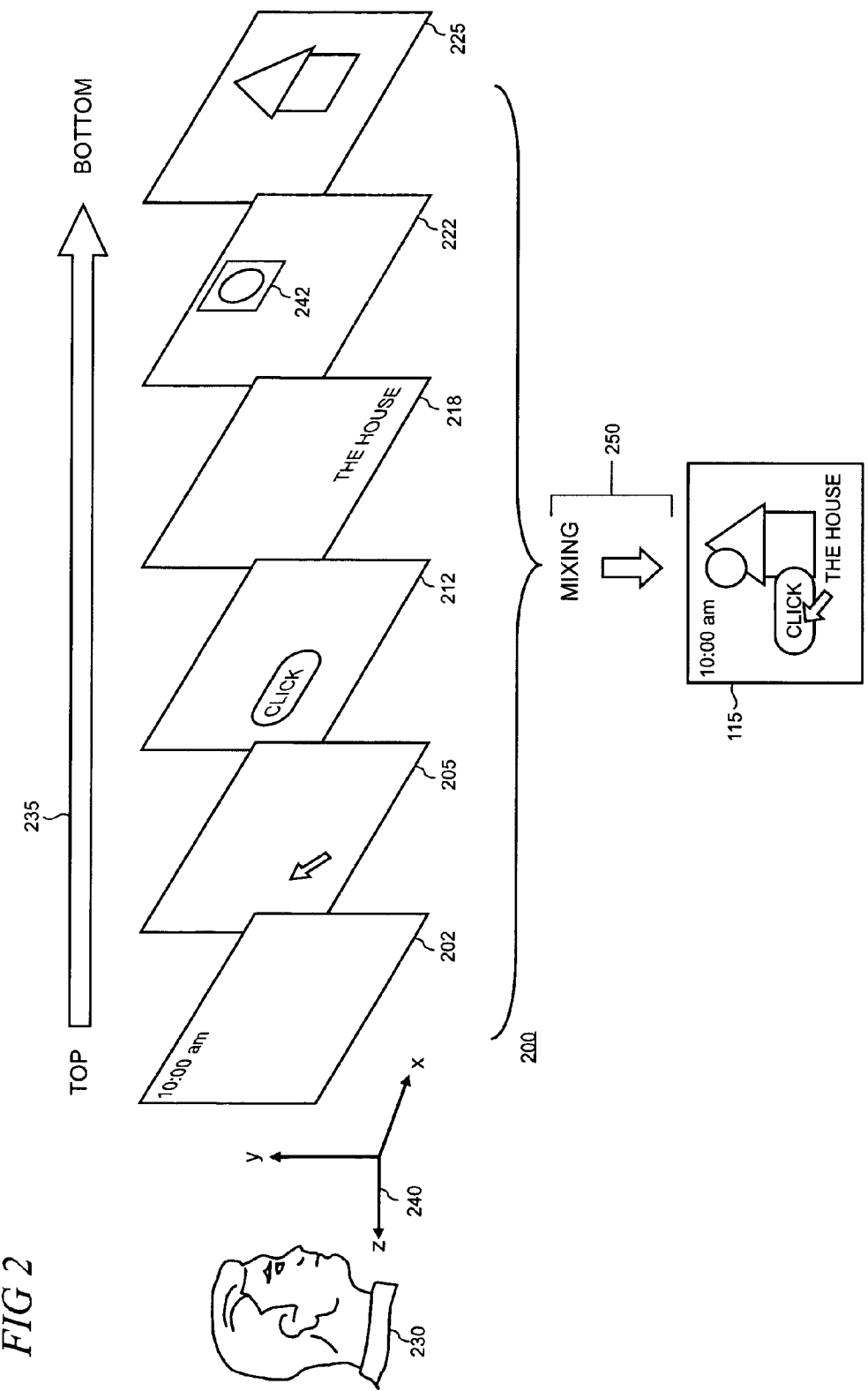
FIG. 2 shows an illustrative set of graphic planes that comprise a 2.5-D graphics environment.

As indicated by reference numeral 115, an illustrative interactive UI is supported by the devices 105. UI 115 is implemented using 2.5-D graphics environment as shown in FIG. 2 below and described in the accompanying text. Here, the UI 115 is implemented using the interactive features provided by the "Advanced Content" interactivity layer that was originally described by the DVD Forum for applicability to a next generation high definition DVD (digital versatile disc) format called "HD-DVD" 1. Many features of Advanced Content are currently being implemented by Microsoft Corporation's HDi technology which enables advanced viewing features including enhanced content, interactive user experiences, content navigation and selection systems, menu systems, and other functionality to be rendered in real-time as the AV content (such as a movie or other content) plays. HDi uses standards including XML (eXtensible Markup Language), HTML (Hypertext Markup Language), CSS (Cascading Style Sheets), SMIL (Synchronized Media Integration Language), and ECMAScript (also known as JavaScipt).

FIG. 2 shows a stack of graphics planes 200 used to support the illustrative 2.5-D UI 115 in an HDi runtime environment or in a runtime environment that implements HDi-like behavior. The stack of graphic planes 200 is utilized to logically group visual elements on a device display by function and/or source. In this example, the graphics plane stack 200 includes a cursor plane 205, an interactive graphics plane 212, a subpicture plane 218, a subvideo plane 222 and a main video plane 225. It is noted that the devices 105 shown in FIG. 1 may alternatively utilize a subset of the plane stack 200 in some implementations.

The OSD (on screen display) plane 202 is the topmost plane (i.e., perceived by user 230 as being on top) in the graphics plane stack 200 and includes OSD objects such as date and time information. In applications using a STB and other devices that provide media content, such OSD objects could include also channel or video source information, for example.

The remaining planes are arranged from the top of the display to the bottom, from left to right, as indicated by arrow 235 in FIG. 2. All planes in the graphics plane stack 200 use a common xy coordinate system. A third dimension is described by a z axis which projects outwardly from the display as indicated by reference numeral 240 in FIG. 2. Typically, applications running in an interactive 2.5-D environment belong to specific planes, as described below. In addition, characteristics of each plane in the stack 200 may differ. For example, the frame rate, color space, resolution, and the size and position of a given plane may be specified independently of other planes in the stack 200.

The cursor plane 205 is the second plane in which cursor objects like pointers are displayed. The graphics plane 212 is the third plane of the graphics plane stack 200 and is generated by the presentation engine as described below in the text accompanying FIG. 3. Applications that generate interactive content such as graphics and menus in an interactive media environment are typically rendered into the graphics plane 212.

The subpicture plane 218 is the fourth plane of graphics plane stack 200 and is typically used to display subtitles and/or captions produced by respective applications. The subvideo plane 222 is the fifth plane in graphics plane stack 200 and is typically used as a secondary video display in a "picture-in-picture" ("PIP") arrangement. A PIP window, like that indicated by reference numeral 242 is often smaller than the main video display and may have other differing characteristics such as reduced resolution, different aspect ratio, etc.

The main video plane 225 is the sixth plane in the graphics plane stack 200 and is positioned at the bottom of the stack of planes. The main video plane 225 is typically used to display video content in the interactive media environment. As shown in FIG. 2, all the planes in graphics plane stack 200 are mixed and composited into the single display 115 through a mixing process, as indicated by reference numeral 250.

Figure 3:
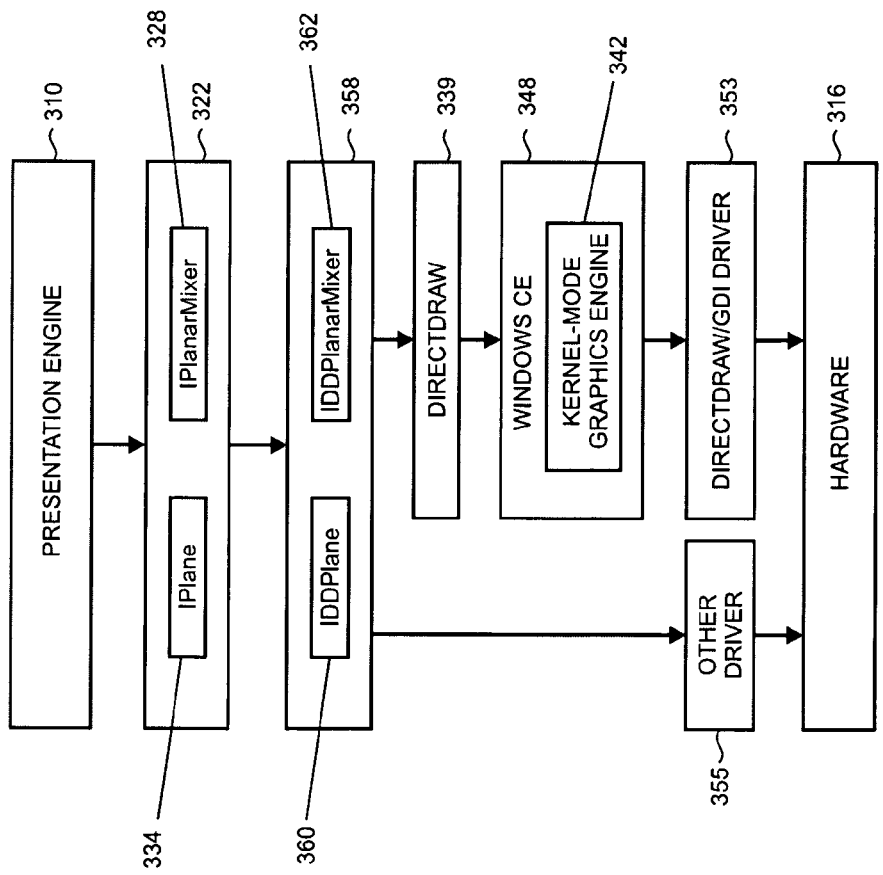
FIG. 3 shows an illustrative software architecture that may be used in an AV content rendering device shown in FIG. 1.

FIG. 3 shows an illustrative software architecture 300 that may be used to implement a playback system in an AV content rendering device 105 shown in FIG. 1. A presentation engine 310 is the top layer in the architecture 300 and is responsible for presenting the planes in the graphics plane stack 200 to a hardware layer 316 that performs a mixing process for compositing and rendering the final screen display. As described in more detail below, the frames in the planes are composited and rendered in a time-synchronous manner.

Below the presentation engine 310 is a 2.5-D UI interface layer 322 which includes two interfaces: IPlanarMixer and IPlane, as respectively indicated by reference numerals 328 and 334. The IPlanarMixer interface 328 is arranged to provide to the presentation engine 310 an abstraction of mixer hardware that is used in a particular device 105 for compositing and rendering the final screen display in the mixing process 250. The IPlane interface 334 is arranged to abstract instances of individual planes that are retrieved from and handed to the IPlanarMixer interface 328.

In this illustrative example, the IPlanarMixer and IPlane interfaces are arranged as conventional COM-like (Common Object Model) interfaces that operate with a Windows CE/Win32 stack which includes a DirectDraw component 339, a graphics engine 342 in the Windows CE kernel 348, and a combination DirectDraw/GDI (Graphics Device Interface) driver 353. In alternative and optional implementations, however, another driver 355 may be utilized to replace the functionality provided by the DirectDraw/GDI driver 353 depending on the particular capabilities of a given device 105. Driver 355 could utilize, for example, one of IOCTLs (input/output controls), graphic driver escape calls, or a combination of both.

A set 358 of Windows CE/Win32-specific APIs including IDDPlanarMixer 360 and IDDPlane 362 is also utilized. IDDPlanarMixer 360 and IDDPlane 362 expose functionality to support HDi graphics composition to various Win32 software applications so that multimedia user experiences may be provided in a Windows CE context.

By comparison, the IPlanarMixer interface 328 and IPlane interface 334 expose HDi functionality in a platform-independent manner. That is, the IDDPlanarMixer 360 and IDDPlane 362 utilize datatypes that are known by Win32 applications. IPlanarMixer 328 and IPlane 334 utilize different datatypes to maintain portability across devices types.

The IPlanarMixer interface 328 is shown below:

```
PORTABLE_INTERFACE( IPlanarMixer, IUnknown, ead80aad, cce2,
49d7, a7, ac, c3, 07, 32, cc, 72, e2 )
    enum PlaneIndex
    {
        MAIN_VIDEO_PLANE = 1,
        SECONDARY_VIDEO_PLANE,
        SUBPICTURE_PLANE,
        HDI0_PLANE,
        HDI1_PLANE,
        CURSOR_PLANE,
        OSD_PLANE,
    };
    STDMETHOD( SetAperature ) (
        _in UINT32 Width, // width of aperture in pixels
        _in UINT32 Height // height of aperture in pixels
        ) = 0;
    STDMETHOD( BeginCompose )(
        _in PlaneIndex xPlane,
        _in CTime       tDisplayStartingAt,
        _out IPlane    **ppPlane
        ) = 0;
    STDMETHOD( EndCompose )(
        _in IPlane *pPlane
        ) = 0;
    STDMETHOD( AbortCompose )(
        _in IPlane *pPlane
        ) = 0;
    STDMETHOD( SetVideoPlaneParameters )(
        _in CTime        tDisplayStartingAt,
        _in const RECT *prMainVideoPositionAndSize
        _in const RECT *prSecondaryVideoPositionAndSize
        );
PORTABLE_INTERFACE_END( IPlanarMixer, IUnknown, ead80aad,
cce2, 49d7, a7, ac, c3, 07, 32, cc, 72, e2 );
```

The IPlanarMixer interface 328 is agnostic as far as color space—for example, RGB (red, green, blue), RGBA (red, green, blue, alpha), YUVA (luminance, chrominance, alpha), Y'UV (luminance, chrominance, chrominance), CMYK (cyan, magenta, yellow, black), etc.—however, RGBA may be typically chosen when using graphic primitives in the known <graphics.h> library.

The IPlanarMixer interface 328 uses a parameter 'CTime' to describe "presentation time" that is used with to implement Advanced Content, as defined above. Presentation time is the monotonically increasing time used to drive HDi applications so that graphics may be correctly composited and rendered in a time-synchronous manner.

The SetAperature method sets the size of the aperture, in pixels, according to metadata contained in a playlist describes the particular interactive features or applications being executed in the environment. It is contemplated that changes will be made relatively infrequently, for example, when a new playlist is loaded. However, calls to this method do not necessarily imply a change in values. For example, if two different playlists are loaded each having the same aperture, then two calls to the SetAperature method can be made with the same values. This could occur, for example in the STB $105_N$ case, when the playlists are associated with high-definition ("HD") movies which use an aperture size of 1920×1080 pixels.

Invoking the BeginCompose method allocates memory for a plane and returns an IPlane to the caller. The IPlane represents a single graphics plane. The video mixing hardware may have special requirements around how the planes 200 are allocated. For example, they may need to be in a special area of memory, or a special type of memory, or memory on a special chip, or in physically contiguous memory.

The 'xPlane' parameter in the method controls where the plane will be allocated in the stack 200. The 'tDisplayStartingAt' parameter denotes the presentation time at which the plane should first be displayed, as described further below.

The caller of the BeginCompose method promises not to use the returned IPlane once it has been passed back to EndCompose/AbortCompose other than to call IPlane::Release on it.

Invoking the EndCompose method returns a finished graphics plane to the IPlanarMixer which queues up the plane and starts displaying it once the presentation time (i.e., 'Ctime') is greater than or equal to the plane's 'tDisplayStartingAt' value. It is possible that EndCompose will be called late—that is, not until after the presentation time has passed the 'tDisplayStartingAt' value. The method is still valid in this case but essentially devolves into "display it now."

IPlanarMixer will continue to display the plane until it has received another plane that has a 'tDisplayStartingAt' value that is greater than that of the displayed plane, and which is less than or equal to the current presentation time.

The presentation engine 310 may want to abort processing of a plane, for example if the plane has exceeded a time budget and the presentation engine decides to abort the processing in favor of working on another plane. The AbortCompose method is thus used to return the aborted plane back to a video memory buffer pool for IPlanarMixer so that the buffer may be recycled for use with a future BeginCompose.

Invoking the SetVideoPlaneParameters method sets the size and position of a plane. The 'tDisplayStartingAt' parameter has semantics matching BeginCompose/EndCompose. This means that the position information may be specified in advance, and the IPlanarMixer must hold the information until the correct time. There is intentionally no ability to specify the plane. This is to avoid having a window for which there is new data for MAIN_VIDEO_PLANE but no received data for SECONDARY_VIDEO_PLANE in time. Thus, the data for both planes is passed atomically, and the specific planes are implied.

As noted above, an IPlane represents a single plane. Memory is allocated for an IPlane via the BeginCompose method exposed in IPlanarMixer and the IPlane is returned via either IPlanarMixer::EndCompose( ), or IPlanarMixer::AbortCompose( ). The IPlane interface 334 is shown below:

```
PORTABLE_INTERFACE( IPlane, IUnknown, f83615fa, 332c, 4d90, 97, 2b, d0,
67, 44, 15, d2, d9)
    STDMETHOD( BeginCompose )(    _in iHD::CTime tDisplayStartingAt,
                                  _out iHD::CImageBuffer **ppImagebuffer
                                  ) = 0;
    STDMETHOD( EndCompose )(      _in iHD::CImageBuffer *pImagebuffer,
                                  _in const RECT *pDirty
                                  ) = 0;
    STDMETHOD( AbortCompose )(    _in iHD::CImageBuffer *pImagebuffer
                                  ) = 0;
    STDMETHOD( AddClearRect )(    _in   const RECT   *pRect,
```

```
            _in    PlaneIndex    xDestinationPlane
            ) = 0;
    STDMETHOD( AnimatePlane )(
        _in iHD::CTime tDisplayStartAt,
        _in const RECT *prSourceStart,
        _in const RECT *prDisplayStart
        _in iHD::CTime tDisplayStopAt,
        _in const RECT *prSourceStop,
        _in const RECT *prDisplayStop
    ) = 0;
    STDMETHOD( UpdateOpacity )(
        _in iHD::CTime tDisplayStartingAt,
        _in UINT32 Opacity
    ) = 0;
    STDMETHOD( AutoErase )(
        _in BOOL Active,
        _in UINT32 rgba
    ) = 0;
PORTABLE_INTERFACE_END( IPlane, IUnknown, f83615fa, 332c, 4d90, 97, 2b,
d0, 67, 44, 15, d2, d9);
```

Invoking the GetImageBuffer method provides access to the CImageBuffer. A plane consists of 'CImageBuffer' which holds the rectangular array of pixels that may be manipulated, for example, via the known <graphics.h> library, as well as a collection of "ClearRect" data. ClearRect data is used by HDi to insert holes or openings that pass through selected planes. For example, a particular effect or interactive experience may be utilized that calls for a rectangular (or other arbitrarily shaped) hole to appear to be punched through a plane to allow an underlying plane to be seen. A menu composed in the interactive graphics plane 212, for example, could include a hole through which the main video plane 225 may be seen.

ClearRect data is passed to the IPlanarMixer using an IPlane because it is part of an HDi graphics plane just as the pixels in the CImageBuffer. ClearRects are managed with respect to presentation time in a similar manner as other objects in a given plane.

Invoking the AddClearRect method adds a clearrect element to an IPlane which internally tracks how many clearrect elements have been added. Typically, an IPlane will support from zero to some minimum number of clearrect elements as may be required to implement a particular graphic effect or feature. Each clearrect element includes both a RECT and a destination plane (i.e., type 'PlaneIndex') through which the RECT punches. For example, specifying the MAIN_VIDEO_ PLANE as the destination will cause a clearrect rectangle to be punched through all the planes between the given plane and the MAIN_VIDEO_PLANE destination.

Figure 4:
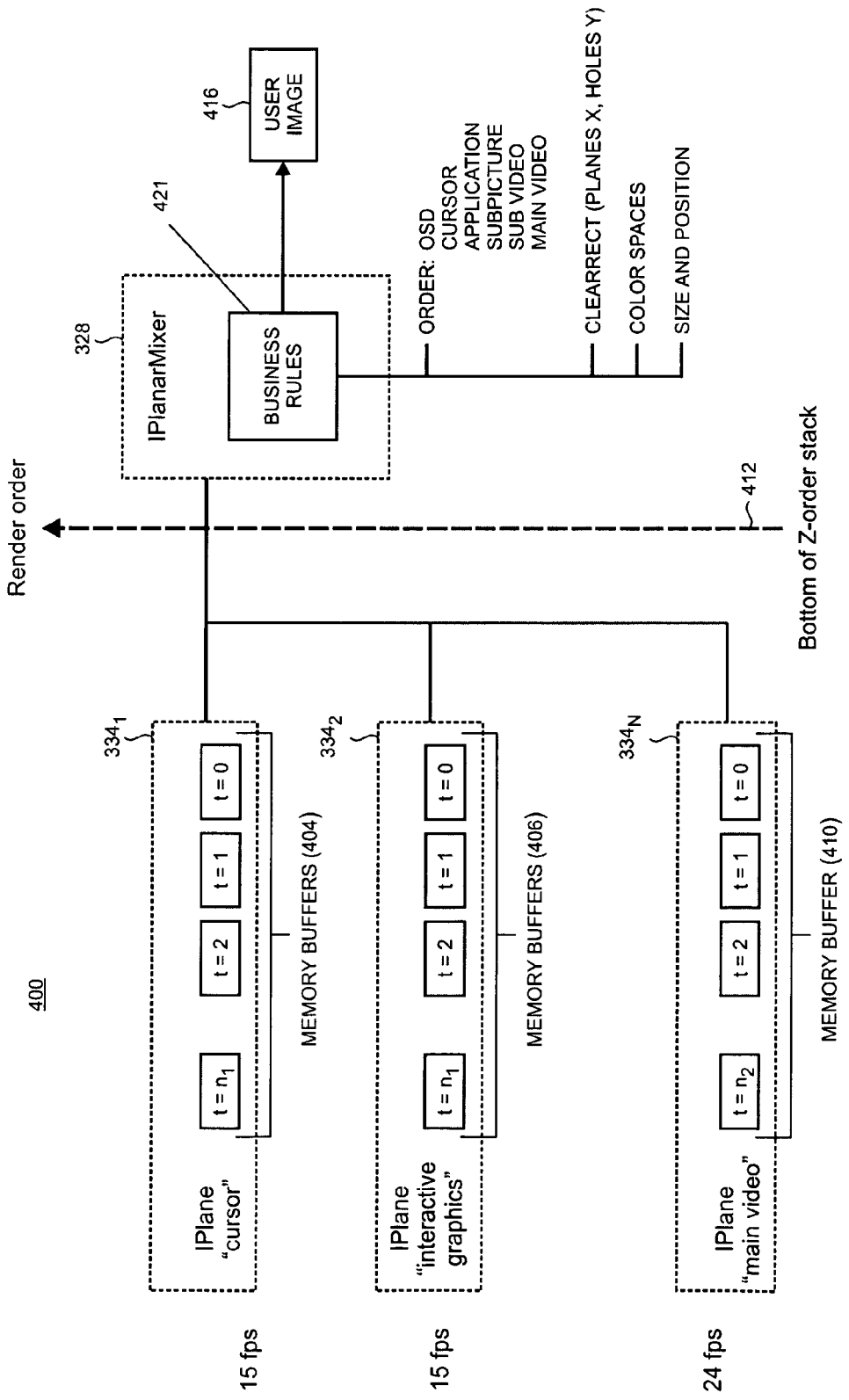
FIG. 4 is a diagram showing details of the IPlanarMixer interface and two instances of IPlanes exposed by the IPlane interface in an illustrative runtime environment.

FIG. 4 is a diagram showing details of the IPlanarMixer interface 328 and two instances $334_1$ and $334_2$ of IPlanes support by the IPlane 334 interface in an illustrative runtime environment 400. In this example, IPlane $334_1$ represents the cursor plane 205 and IPlane $334_2$ represents the interactive graphics plane 212 in the plane stack 200.

Each IPlane 334 provides an abstraction of a group of N video back buffers, i.e., a memory buffer (respectively indicted by reference numerals 404 and 406) where each back buffer is associated with a particular timestamp, t=0, t=1 . . . t=n. Thus, at a given presentation time, the user image 416 will comprise what an end user sees at that instant, while the back buffers 404 and 406 will also contain data to composite the images the end user will see in the future. While video frames do not necessarily need to be input to the IPlanarMixer interface 328 in all implementations, they may still logically be represented with an IPlane $334_N$ and backs buffers 410 in the same manner, as represented by reference numeral. In this example, the cursor plane and interactive graphics planes are produced at 15 frames per second ("fps") while the main video plane is produced at 24 fps. As indicated by arrow 412, the planes 334 are rendered from the bottom of the Z-order stack upwards.

IPlanarMixer 328 is typically arranged to take the IPlane abstractions of the different planes, each having different frame rates which are not synchronized, to composite a final user image 416 on a time-synchronized basis according to a set of business rules 421. In general, the business rules 421 can implement mixing functionality that is required to composite the planes on a time-synchronized basis so that the finished user image 416 appears correctly and makes sense. In this particular example, more specifically, the business rules 421 are applied by the IPlanarMixer 328 so that each of the planes is correctly ordered, appear in the desired size and location, clearrect elements are implemented properly, and the color spaces are accurately rendered.

Application of the business rules 421 can take different factors of the runtime environment into account so that various types of behavior for the IPlanarMixer 328 are implemented. For example, graphic planes will typically be generated to extent that resources in the environment such as processing power, memory, etc. (which are inherently scarce) allow a presentable form to be produced for rendering at a given time. Given the dynamic nature of such environment, the IPlanarMixer 328 may utilize a memory buffer (i.e., buffer 404, 406, and 410) that represents the "latest" (i.e., t=0), or "the latest, but not later than t=2", or "the nearest to t=2, even if t=2 has past" and so forth.

With regard to color spaces, it is observed that the various digital representations may be used in individual planes. Even within a given color space, the number of bits used for the representation can affect how variations of color may be represented and there are generally different way to distribute color overall within a given n-bit color space.

For example, the main video plane 225 may be encoded using a Y'UV color space with 32 bits per pixel, while the cursor plane 205 is encoded using an RGB color space with 16 bits per pixel. In order to satisfy a VGA (Video Graphics Array) display requirement, the final composited output is encoded in RGB with 32 bits per pixel. The IPlanarMixer interface 328 will enable these color spaces to be coalesced through application of business rules that may include any of a variety of strategies so that the final composited appears correctly (i.e., correct order of planes with the right size and location, clearrect elements are implemented properly, and the color spaces are accurately coalesced).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for supporting interactive graphics composition in a rendering environment, operating as one or more processes or sub-processes programmed for execution on a computing platform, the method comprising the steps of:
    allocating memory in which a graphics plane may be rendered, as a first process or sub-process performed by a mixing interface that exposes a method for supporting an interactive graphics composition process in a rendering environment, the graphics plane being rendered as a component of a 2.5-D stack and the mixing interface providing an abstraction of a hardware layer including mixing hardware operating on the device to the interactive graphics composition process;
    receiving an abstraction of the graphics plane at the mixing interface as a second process or sub-process performed by the mixing interface, the abstracted graphics plane being implemented by a graphics plane interface using a series of back buffers, each back buffer having an associated time stamp, representing a finished graphics frame generated by a hardware layer operating on the device into which interactive content is rendered; and
    applying business rules, as a third process or sub-process performed by the mixing interface, and using the associated time stamps, to compose the finished graphics frame into the 2.5-D stack in a time-synchronous manner.

2. A computer-implemented method of claim 1 in which the 2.5-D stack is an HDi stack.

3. A computer-implemented method of claim 1 in which the mixing interface exposes functionality as substantially provided by SoC hardware.

4. A computer-implemented method of claim 1 in which the interactive content includes at least one of interactive navigation, interactive menu system, or interactive user experience.

5. A computer-implemented method of claim 1 in which the interactive content comprise Advanced Content as described by the DVD Forum.

6. A computer-implemented method of claim 1 in which the business rules implement a finished graphics plane composition according to at least one of Z order of graphics planes within the 2.5-D stack, position of clearrect elements used to implement openings through one or more graphics planes in the 2.5-D stack, size of a window in which a graphics plane is rendered, or position of the window in which the graphics plane is rendered.

7. A computer-implemented method of claim 1 in which the method includes a further step, as a fourth process or sub-process performed by the mixing interface, of queuing a graphics plane for presentation in the rendering environment in accordance with a current presentation time.

8. A computer-implemented method of claim 7 in which the method includes a further step, as a fifth process or sub-process performed by the mixing interface, of aborting composition of a graphics plane when time budgeted for the composition will result in presentation of the composed graphics plane beyond the current presentation time.

9. A computer-implemented method for enabling time synchronous compositing of a graphics plane in a 2.5-D stack, operating as one or more processes or sub-processes programmed for execution on a computing platform, the method comprising the steps of:
    providing an abstraction of the graphics plane using a graphics plane interface to a graphics composition process operating on the device in a first of one or more processes or sub-processes performed by a mixing interface that provides an abstraction of a hardware layer operating on the device and the graphics composition process, the abstraction of the graphics plane being implemented using a series of back buffers representing a finished graphics frame generated by the hardware layer, each back buffer having an associated time stamp that is usable by the graphics composition process when compositing the graphics plane in the 2.5-D stack;
    holding, in a second of the one or more processes or sub-processes performed by the mixing interface, a rectangular array of pixels in the abstraction, the array of pixels being subject to manipulation through one or more functions included in a library of graphic primitives; and
    holding, in a third of the one or more processes or sub-processes performed by the mixing interface, data for constructing openings through the graphics plane, the openings constructed when the graphics plane is composited among a plurality of graphics planes used to implement the 2.5-D stack.

10. The computer-implemented method of claim 9 in which the graphics composition process is implemented using a presentation engine arranged for presenting the plurality of graphics planes utilized environment to mixing hardware that performs a mixing process for time-synchronously compositing and rendering a display from the plurality of graphics planes.

11. The computer-implemented method of claim 9 in which the plurality of graphics planes comprise one or more of OSD plane, cursor plane, interactive graphics plane, sub-picture plane, subvideo plane, or main video plane.

12. The computer-implemented method of claim 11 including the further steps of tracking, in a fourth of the one or more processes or sub-processes, a number of openings used in a graphics plane, and tracking, in a fifth of the one or more processes or sub-processes, a destination plane, openings being generated in ones of the plurality of graphics planes that are positioned between the destination plane and the main video plane in the 2.5-D stack.

13. A computer-implemented method for implementing a 2.5-D user interface in a graphic display that is rendered by a device, operating as one or more processes or sub-processes programmed for execution on a computing platform, the method comprising the steps of:
    utilizing a presentation engine configured for presenting a plurality of graphics planes utilized with the 2.5-D user interface to mixing hardware in a hardware layer that performs a mixing process for time-synchronously compositing and rendering the display from the plurality of graphics planes; and
    instantiating interfaces accessible by the presentation engine including a mixing interface for abstracting the mixing hardware to the presentation engine and a graphics plane interface for abstracting individual instances of the plurality of graphics planes as a series of back buffers for utilization by the mixing interface, the individual instances of abstracted graphics planes representing respective finished graphics frames generated by the hardware layer.

14. The computer-implemented method of claim 13 in which the mixing interface is further configured for applying business rules to compose finished graphics frames into a Z ordered stack in a time-synchronous manner for rendering the 2.5-D user interface.

15. The computer-implemented method of claim 13 in which the mixing interface and the graphics plane interface are each configured as COM interfaces.

16. The computer-implemented method of claim 13 further including Win32-specific APIs for exposing functionality associated with HDi graphics composition to one or more Win32 applications that operate on the device.

17. The computer-implemented method of claim 13 in which the mixing interface and the graphics plane interface are each configured to be portable across device types.

18. The computer-implemented method of claim 13 in which the device is a thin client device selected from one of mobile phone, smart phone, pocket PC, PDA, GPS navigation unit, personal media player, set top box, handheld game device, or device combining one of more functionalities provided therein.

19. The computer-implemented method of claim 13 in which the device is a thin client device that runs an embedded operating system.

\* \* \* \* \*